United States Patent Office 3,226,687
Patented Dec. 28, 1965

3,226,687
MODULAR COMPUTER SYSTEM CONNECTION REJECTION CAPABILITY

Lowell D. Amdahl, Weaver T. Brian, Jr., and Alfred D. Scarbrough, Northridge, and Edward J. Schneberger and Ralph J. Koerner, Canoga Park, Calif.; said Amdahl, Brian, Scarbrough, and Schneberger assignors, by mesne assignments, to The Bunker-Ramo Corporation, Stamford, Conn., a corporation of Delaware
Filed July 3, 1961, Ser. No. 121,458
9 Claims. (Cl. 340—172.5)

This invention relates generally to modular computer systems of the type disclosed in applicants' copending application Serial No. 121,593 entitled "Modular Computer System" filed on July 3, 1961, and more particularly to an improved system characteried initially by its ability to reject connection commands addressing modules which are "busy" and secondly by the ability of certain modules to function as both controlling and controlled modules.

In applicants' above-mentioned copending application, a modular computer system is disclosed in which any one of a plurality of controlling modules (defined as devices capable of operating under their own stored program, such as computers) is able to issue a connection command containing the address of any one of a plurality of controlled modules. An exchange sense section is responsive to the commands and functions to close a normally open communication path which interconnects the controlling module issuing the command and the controlled module addressed by the command. Although a feature of that system lies in the fact that several different communication paths may be concurrently maintained, it is desirable to prevent the possibility of two different controlling modules being concurrently interconnected with the same controlled module. In order to prevent this possibility, it is necessary that the programs of the respective controlling modules be written so this cannot occur, thereby placing a significant burden upon the programmer and limiting the usefulness of the system.

It is accordingly a general object of this invention to provide a modular computer system which incorporates the ability to reject connection commands from controlling modules when the controlled module addressed by the command is "busy" (i.e., already interconnected with a controlling module).

It is an additional object of this invention to provide in a modular computer system, means for establishing connection priority between controlling modules which simultaneously issue connection commands addressing the same controlled module.

In implementing the above objects, means are provided for appropriately generating "command accepted" and "command rejected" signals which are sent to the controlling modules to advise of the action taken by the exchange in response to a connection command.

It has been pointed out that each controlling module should be capable of generating connection commands addressing each of the controlled modules. As an additional feature of the invention, provision is made for the issuance of a disconnect command by each controlling module for permitting it to break connection between itself and any controlled module. Also, each time a connection command is rejected, the disconnect address which forms part of the disconnect command, is automatically generated and stored in the connection address register serving the module issuing the command to assure that the register always stores either the address of the controlled module to which the controlling module is presently connected or the disconnect address.

It is a still additional object of this invention to provide in a modular computer system, means enabling certain modules to perform as either controlling or controlled modules. A feature of the invention resulting from the fulfillment of this object permits buffer modules to be initially used in a controlling mode wherein they can operate independently of computer modules to e.g. search for and organize data and then secondly in a controlled mode permitting a computer module to use the buffer module as conveniently as it can its own memory. A further feature of the invention involves means for rejecting connection commands which address modules which though not "busy" in a controlled mode are "busy" in a controlling mode.

Briefly, the invention provides, in a modular computer system, means for preventing a controlling module from gaining access to an addressed module which is "busy" in either a controlled or controlling mode.

More particularly, the invention contemplates a connection address register connected to each controlling module for storing the address portion of connection or disconnect commands. Newly entered addresses in each register are compared with addresses already stored in other registers and connections between controlling and addressed modules are made only if the comparison shows that the addressed module is not busy. Disconnect commands are always executed.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

Figure 1:
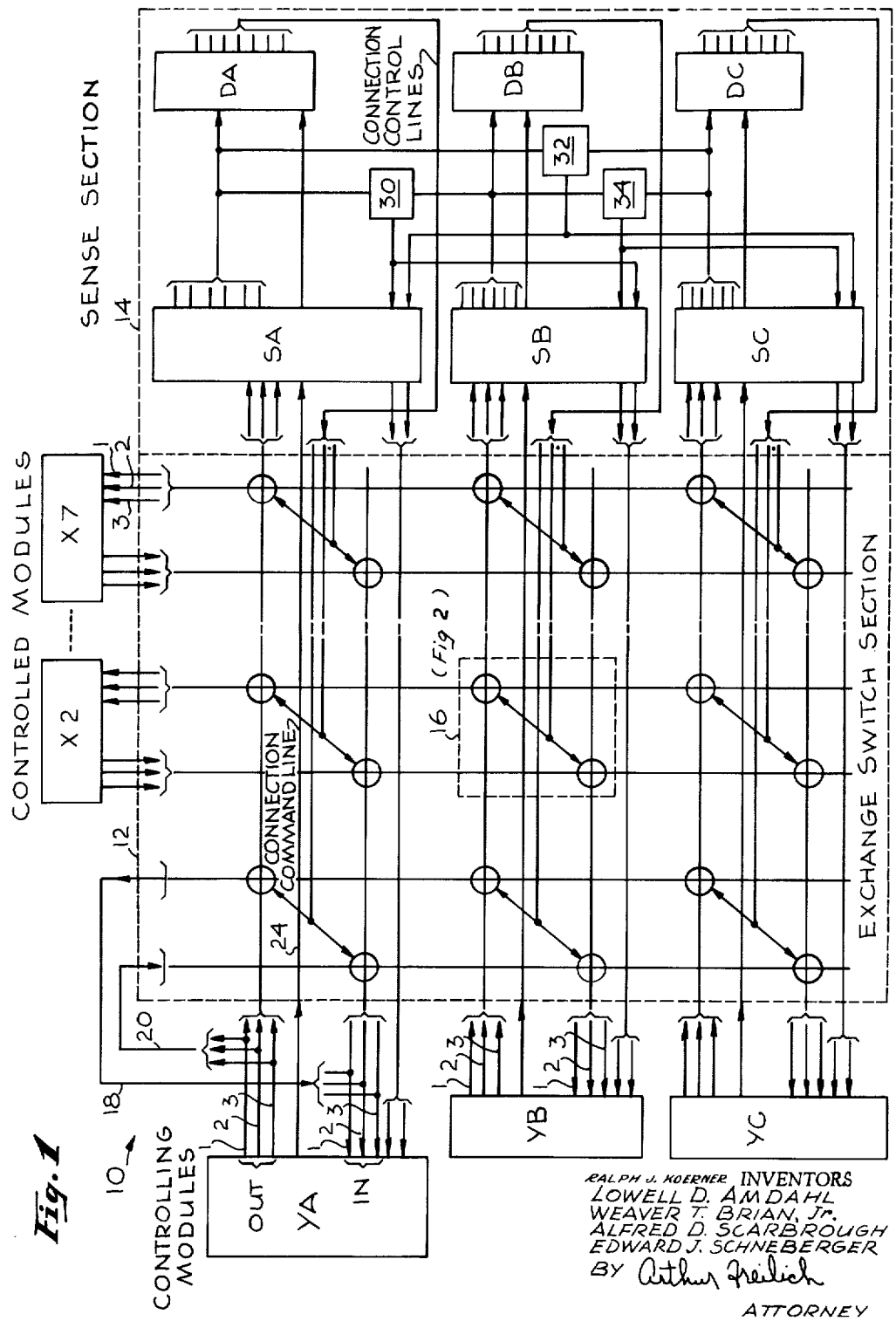
FIGURE 1 is a block diagram of a typical system organization showing the relationship between the controlling and controlled modules, the exchange, and the sense units.

With continuing reference to the drawings, initial attention is called to FIGURE 1 wherein a modular computer system incorporating the invention herein, is illustrated. Particularly, the system includes an improved exchange 10 including basically two distinct sections; namely, a switch section 12 and a sense section 14.

As disclosed in the previously referred to copending application, the switch section 12 provides a plurality of normally open information channels formed by a matrix including a plurality of intersecting electrical conductors interconnected by means 16. The switch section 12 may be considered as possessing two axes to which modules may be connected; that is, the vertical axis (Y axis) having position therealong to which controlling modules may be connected and the horizontal axis (X axis) having positions therealong to which controlled modules (or controlling modules operating in a controlled mode) may be connected. In the typical system described herein, controlling modules YA, YB and YC are conected to the switch section 12, respectively, at the first three positions of the vertical axis while controlled modules X2 through X7 are connected respectively at positions 2 through 7 of the horizontal axis. A special case is illustrated with respect to position 1 on the horizontal axis. In lieu of connecting a controlled module at this position, cables 18 and 20 are utilized to connect the output and input lines respectively of controlling module YA to the conductors which would, in the general case, be connected to the output and input conductors respectively of a controlled module.

Inasmuch as each controlling module must be able to communicate with each controlled module and any other controlling module connected to the switch section horizontal axis, all modules must be standardized with respect to their information handling capabilities. For the sake of simplicity in explanation, the information format utilized will comprise informaton transfers between modules in words three bits in length. Accordingly, each of the modules has three output lines and three input lines and each axis of the switch section 12 therefore includes six lines multiplied by the number of modules connected to the axis. In addition to the input and output lines, each controlling module is provided with a connection command line 24.

Figure 2:
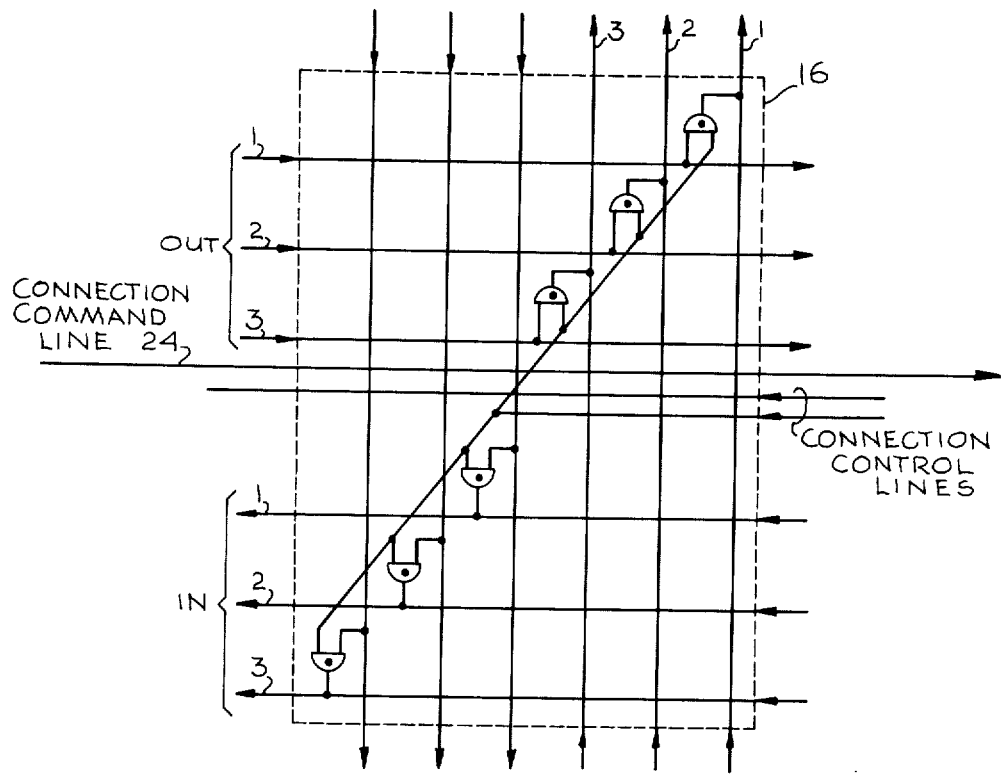
FIGURE 2 is an enlarged schematic view illustrating the details of the circuitry represented by circles in FIGURE 1.

The means 16 may be considered as a normally open switch and may comprise "and" gates as shown in FIGURE 2, interconnecting each line from each set of lines on one axis with one line from every set of lines on the other axis. In order for a communication path to exist between a pair of modules, the means 16 interconnecting the set of six lines connected to the module on the vertical axis with the set of six lines connneected to the module on the horizontal axis, must be closed. Accordingly, a complete set (6) of "and" gates (may be enabled each time a communication path is established between a pair of modules. The signals enabling an appropriate set of "and" gates are provided on connection control lines connected to a connection address decoding network DA, DB, DC forming a part of the sense section 14.

As noted, each of the controlling modules YA, YB, YC, under program control is capable of issuing a connection command which uniquely addresses each of the positions on the horizontal axis of the switch section 12. As is well known in digital techniques, information may be represented by using two discrete voltage levels, e.g., a high voltage level may be representative of a "1" or a true condition and a low voltage level of a "0" or a false condition. A connection command is defined as one which sets a connection command line 24 true and applies a connection address to the three output lines with which it is associated. A disconnect command is a special case of a connection command and includes an arbitrarily defined address of all zeros on the output lines representing a non-existent position on the horizontal axis.

Figure 3:
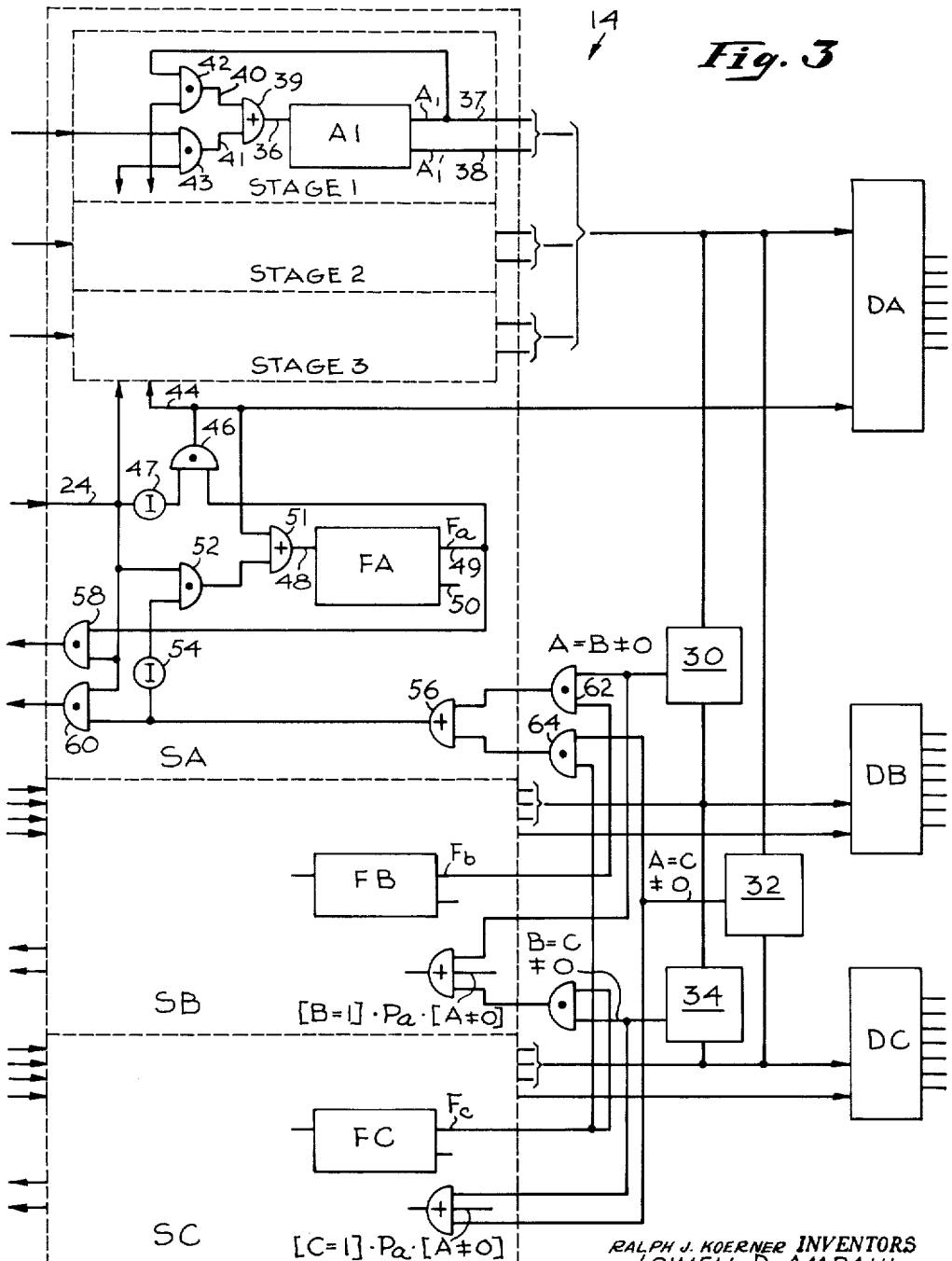
FIGURE 3 is an enlarged block diagram showing in greater detail the sense units of FIGURE 1.

Attention is now called to FIGURE 3 wherein the sense section 14 of FIGURE 1 is illustrated in greater detail. The sense section 14 includes identical sense units, SA, SB, SC connected to controlling modules YA, YB, YC, respectively. The sense unit SA connected to controlling module YA includes a three-stage connection address register A and associated gating equipment. Likewise registers B and C are connected to modules YB and YC respectively. Inasmuch as the sense units SB and SC are identical to sense unit SA, only the details of the latter are illustrated and the former are represented by dotted boxes. Similarly, since each register includes three identical stages consisting of delay flip-flops (e.g., A1, A2, A3) and appropriate gating, only the details of stage 1 of the A register are illustrated.

Broadly, the system operates such that the connection address registers A, B, C store the address portion of connection commands and provide appropriate inputs to decoding networks DA, DB, DC, respectively, to energize the connection control lines to enable an appropriate set of switch section "and" gates to establish the communication path designated by the command. However, prior to providing inputs to the decoding networks DA, DB, DC, newly entered addresses in each register are compared with existing addresses in the other registers by comparators 30, 32, 34 in order to determine whether the module connected to the position on the horizontal switch section axis addressed by the command is "busy" or in other words already connected to a controlling module.

More specifically, stage 1 of connection address register A includes a delay flip-flop A1 having a single input terminal 36 and a pair of complementary output terminals 37, 38. This type of delay flip-flop is well known in the art and functions to provide a true output level $A_1$ on terminal 37 and a complementary false output level $A_1'$ on terminal 38 as long as a true input level $_1a_1$ is present on terminal 36. (This nomenclature will be used with respect to the levels associated with all the flip-flops. As a further example, $_1b_2$ represents a true input level to flip-flop B2 of stage 2 of the B register causing a true output level $B_1$ on terminal 37 and a false output level $B_1$ on terminal 38. A false input level $_0b_2$ will of course establish opposite output levels.) If a false input level $_0a_1$ is then applied to terminal 36, after a predetermined time delay, the output condition will reverse; that is, signal $A_1$ on terminal 37 will be at a false level and signal $A_1'$ on terminal 38 will be at a true level. In the former condition, the flip-flop is said to be true while in the latter, it is said to be false.

Input terminal 36 is connected to the output of "or" gate 39 having inputs 40, 41 connected to the outputs of "and" gates 42, 43, respectively. The inputs to "and" gate 43 comprise the connection command line 24 and output line 1 of controlling module YA. (It should be understood that all controlling module output lines are connected in like fashion, e.g., output line 3 of controlling module YB would be connected as on input to "and" gate 43 of stage 3 of the B register.) The inputs to "and" gate 42 comprise line 44 (connected to the output of "and" gate 46) and flip-flop A1 output terminal 37.

The connection command line 24 is connected to the input of "and" gate 46 through an inverter 47. Each of the sense units SA, SB, SC include in addition to the flip-flops in the connection address register a delay flip-flop FA, FB, FC, respectively. These latter flip-flops are identical to the flip-flops utilized in the registers and possess an input terminal 48 and output terminals 49 and 50. True level output signals on terminal 49 of flip-flops FA, FB, FC, designated respectively $F_a$, $F_b$, $F_c$, exist when the flip-flops are true. True level output signals on terminals 50, designated $F_a'$, $F_b'$, $F_c'$ exist when the flip-flops are false. Terminal 49 of flip-flop FA is connected to the input of "and" gate 46. The output of "or" gate 51 is connected to the input terminal 48 of flip-flop FA. The inputs to "or" gate 51 comprise the output of "and" gate 46 and output of "and" gate 52. The inputs to "and" gate 52 comprise the connection command line 24 and the output of inverter 54 whose input comprises the output of "or" gate 56. The inputs to "and" gate 58 comprise the connection command line 24 and output terminal 49 of flip-flop FA. The inputs to "and" gate 60 comprise the connection command line 24 and the output of "or" gate 56. The "and" gates 58 and 60 respectively, generate signals "command accepted" and "command rejected."

Decoding networks DA, DB, DC are connected to sense units SA, SB, SC, respectively. The decoding networks are identical to each other and are of the type disclosed in the previously mentioned copending application. Each network includes seven "and" gates whose inputs are unique combinations of the output lines of the flip-flops of the associated connection address register. An "and" gate need not be provided for the combination representing the disconnect address. In addition line 44 is connected as an input to each "and" gate. Accordingly, when the signal on line 44 is true, the output line of only one of the seven "and" gates is set true. All of the network "and" gate output lines constitute connection control lines for enabling sets of "and" gates interconnecting lines in the switch section 12.

When a connection command is issued by any controlling module, a determination must be made as to whether the command should be rejected or executed. In order to determine this, a comparison is made, by comparators 30, 32, 34, between the connection address in question and the contents of the address registers of the other sense units. If the address in question exists in another register, then in general the command should be rejected. In the preferred embodiment of the invention illustrated, two exception exist. Initially, any number of controlling modules, YA, YB, YC must be allowed to be disconnected simultaneously and therefore disconnect commands must always be executed, regardless of address equalities and secondly, when two or more identical connection commands are simultaneously issued, only one of the commands should be executed and the others rejected. The implementation of these criteria are effected by the inputs to "or" gates 56 of the respective sense units SA, SB, SC. A discussion of these inputs will be momentarily deferred until after the operation of the sense units is described, it being presently assumed that a true output from "or" gate 56 means that the requested address is not acceptable and a false output means that it is acceptable. A true level on the output line of gate 56 of sense unit SA is designated AR and a false level AR'; likewise the outputs of gates 56 of sense units SB and SC are respectively BR, BR' and CR, CR'.

When a connection command is issued by module YA, connection command line 24 carries a true level and as a consequence the input to gate 46 through inverter 47 is false causing the signal on line 44 connected to gate 46 to go false. This causes flip-flops A1, A2, A3 to cease holding any stored address since the output of gate 42 must go false. Since the connection command line 24 is coupled directly to gate 43 along with the controlling module output lines, the address carried by the output lines is inserted into flip-flops A1, A2, A3. If the output of gate 56 is false, both inputs to gate 52 will be true and accordingly flip-flop FA is set true. Since the two inputs to gate 58 are then true, a "command accepted" signal is issued and coupled back to module YA As noted, line 44 is connected as an input to each of the decoding network DA "and" gates. Accordingly, as long as the connection command is being issued by the controlling module YA, the signal on the connection command line 24 is true and the signal on line 44 will be false. Therefore, the decoding network DA will not apply a true signal to one of the connection control lines. However, as soon as the module YA ceases to present the connection command, the signal on line 24 will go false and the signal on line 44 will become true. As a consequence, one of the seven decoding network "and" gates will energize its connection control line in accordance with the address in the register. It will also be realized that when signal on line 44 becomes true, the output of gate 42 will be true if its associated flip-flop has been set true and false if it has been set false. It will be seen therefore that gate 42 serves to hold the storage content in each register flip-flop after the connection command is no longer presented by the controlling module.

If on the other hand, the output of gate 56 is true, the output of inverter 54 will be false. Consequently, the output of gate 52 will be false and accordingly flip-flop FA is set false. Therefore, no command accepted signal is issued by gate 58. However, a command rejected signal is issued by gate 60 inasmuch as line 24 and the output of gate 56 are true. When the module YA ceases to present the connection command, the signal on line 44 will remain false inasmuch as flip-flop FA has been set false. Accordingly, no true signal is presented to any of the connection control lines. Since the signal on line 44 remains false even after the signal on line 24 becomes false, gate 42 will not serve to hold the information stored in the register flip-flops and consequently, each of the register flip-flops is set false representing the previously mentioned arbitrarily defined disconnect address.

The inputs to gate 56 of each sense unit should be implemented according to the acceptance and rejection criteria desired. It has been pointed out that connection commands should be executed unless the address in question already appears in another register meaning that the addressed module is "busy." It has also been pointed out that disconnect commands should always be executed regardless of address equalities. Also, it has been mentioned that means for establishing priority between controlling modules simultaneously issuing identical connection commands should be provided so that only one command is executed and the other rejected. Arbitrarily, in the system shown, module YA will be given priority over modules YB and YC and moduel YB will be given priority over YC.

The outputs of gates 56 of sense units SA, SB, SC have already been designated as AR, BR, and CR, respectively. In order to implement the above criteria, the following logical functions must be generated:

(1) $AR = [A = B \neq 0].F_b + [A = B \neq 0].F_c$
(2) $BR = [A = B \neq 0] + [B = C \neq 0].F_c$
(3) $CR = [A = C \neq 0] + [B = C \neq 0]$ where e.g., $A = B$ means $A1 = B1$, $A2 = B2$, and $A3 = B3$. The functions $[A = B \neq 0]$, $[A = C \neq 0]$ and $[B = C \neq 0]$ are generated by comparators 30, 32, and 34, respectively. Comparators for generating these functions are well known in the art and comprise arrangements of standard gates. [E.g.$[A = B \neq 0]$ is the complement of $[A \neq B$ or $A = 0]$ which is equal to $$A_1.B_1' + A_1'B_1 + A_2.B_2' + A_2'B_2 + A_3B_3' + A_3'B_3 + A_1'A_2'A_3']$$

Equation (1) above means that the output of gate 56 of sense unit SA is true and the address in the A register is accordingly not acceptable if the same non-zero address exists in the B register and flip-flop FB is true, i.e., if gate 58 of sense unit SB is signalling or has already signalled "command accepted." A similar relationship exists with sense unit SC.

Equation (2) above means that the address in the B register is not acceptable if the same non-zero address exists in the A register regardless of whether or not gate 58 of sense unit SA has signalled "command accepted." The result of this is that, if controlling modules YA and YB simultaneously issue identical connection commands, the command issued by module YA will be executed and the command issued by module YB will be rejected. However with respect to sense unit SC, the address in the B register is rejected only if the same non-zero address exists in the C register and flip-flop FC is true.

Equation (3) above means that the address in the C register is not acceptable if the same non-zero address exists in the A or B registers regardless of whether or not either of sense units SA or SB are signalling or have signalled "command accepted." Accordingly, it is seen that module YA has priority over modules YB and YC and module YB has priority over module YC.

Inasmuch as certain controlling modules (e.g., YA) may also be connected to the horizontal axis of switch section 12, a further criteria for rejecting connection commands must be incorporated into the arrangement of FIGURE 3 so that a connection command from a module, e.g., YB, will be rejected if it addresses position one on the horizontal axis to which module YA is connected and module YA is already connected in a controlling mode to a controlled module, i.e., the A register contains a non-zero address. A flip-flop PA (not shown) is provided and arranged so that it is true if YA is connected to the horizontal axis (as illustrated) at position one and false if it isn't. For simpilcity herein the system contemplates restricting module YA's connection to position one. In order to incorporate this criteria into the arrangement of FIGURE 3 equations (2) and (3) above should be modified as follows:

(2a); $BR = [A=B\neq 0] + [B=C\neq 0].Fc$
$+ [B=1].P_a.[A\neq 0]$ (3a); $CR = [A=C\neq 0] + [B=C\neq 0]$
$+ [C=1].Pa.[A\neq 0]$ where e.g., [B=1] means that the address stored in the B register refers to position one on the horizontal switch section axis.

Equation (2a) above means that the address in the B register is not acceptable if, in addition to the previously described criteria, it addresses a position (one) on the horizontal axis to which a controlling module (YA; as indicated by the term "Pa") is connected and the controlling module is already interconnected with a controlled module (as indicated by [A≠0]).

From the foregoing it should be realized that the invention is of course not limited to the system illustrated and is applicable to much larger systems utilizing many times the number of modules shown, and permitting as many of the controlling modules utilized as desired to function in both controlling and controlled modes.

The invention therefore permits, in a modular computer system, programs to be written for controlling modules independent of programs for other controlling modules inasmuch as the system logic prevents interference between the activities of the various controlling modules. By assigning priorities to the various controlling modules so as to accept only one communication command when identical ones are simultaneously issued, processing speeds are increased and system lockups prevented.

The "command rejected" signal may be used to cause the controlling modules to proceed with other processing tasks or to hold the connection command on its output line. If the command is held, it will automatically be accepted, without the necessity of controlling module re-issuing it, inasmuch as the output of gate 56 will become false when the acceptance criteria is met. If the command is not held, the disconnect address is automatically placed in the register associated with the module issuing the command and accordingly the addressed module is not thereafter made unavailable to other controlling modules.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. In a data processing system including a plurality of controlled modules and a plurality of controlling modules wherein each controlling module is capable of providing a plurality of different connection commands each of which uniquely addresses one of said controlled modules; interconnecting means for establishing communication paths between any controlling module and any controlled module in response to said connection commands comprising: a plurality of normally open information channels interconnecting each controlling module with each controlled module; a register associated with each controlling module for storing the address portion of said connection commands; comparing means associated with said registers for comparing a newly entered address in any register with addresses stored in all other registers; means for rejecting connection command whose address portion is identical to an address stored in any other register; means for accepting a connection command whose address portion is not identical to an address stored in any other register; and means for closing the normally open information channel interconnecting the commanding controlling module and the controlled module addressed by an accepted connection command.

2. A modular data processing system comprising an exchange including a first group of sets of conductors and a second group of sets of conductors, normally open means interconnecting each conductor from each set of said first group with a conductor from each set of said second group, sense means connected to said conductor sets of said first group and responsive to signals thereon for closing said interconnecting means between selected sets of conductors of each of said groups; controlled modules; programmed controlling modules capable of providing said signals, each of said controlled modules connected to said sets of conductors of said second group, each of said controlling modules connected to said sets of conductors of said first group and at least one of said controlling modules connected to sets of conductors of both said first and second groups.

3. In a data processing system including a plurality of controlled modules and a plurality of controlling modules wherein each controlling module is capable of providing a plurality of different connection command signals each of which is identifiable with one of said controlled modules; interconnecting means for establishing communication paths between any controlling module and any controlled module in response to said connection command signals comprising: a plurality of normally open information channels interconnecting each controlling module with each controlled module; a register associated with each controlling module into which connection command signals therefrom are entered; comparing means associated with said registers for comparing a newly entered connection command signal in any register with signals stored in all other registers; means for generating an acceptance signal and closing the normally open information channel interconnecting the commanding controlling module with the controlled module identified by the newly entered connection command signal when the newly entered connection signal is not identical with a signal stored in any other register; and means for generating a rejection signal when the newly entered connection command signal is identical with a signal stored in any other register.

4. In a data processing system including a plurality of controlled modules and a plurality of controlling modules wherein each controlling module is capable of providing a plurality of different connection command signals each of which is identifiable with one of said controlled modules; interconnecting means for establishing communication paths between any controlling module and any controlled module in response to said connection command signals comprising: a plurality of normally open information channels interconnecting each controlling module with each controlled module; a register associated with each controlling module into which connection command signals therefrom are entered; comparing means associated with said registers for comparing a newly entered connection command signal in any register with signals stored in all other registers; means for generating an acceptance signal and closing the normally open information channel interconnecting the commanding controlling module with the controlled module identifiable with the newly entered connection command signal when the newly entered connection signal is not identical with a signal stored in any other register; means for generating a rejection signal when the newly entered connection command signal is identical with a signal stored in any other register; and means for accepting only a predetermined one of a plurality of identical signals entered into said registers simultaneously and rejecting all others.

5. In a data processsing system including a plurality of controlled modules and a plurality of stored program controlling modules wherein each controlling module is capable of providing a plurality of different connection command signals each of which is identifiable with one of said controlled modules and a disconnect command signal which is identifiable with no controlled module; interconnecting means for establishing communication paths between any controlling module and any controlled module in response to said connection command signals comprising: a plurality of normally open information channels interconnecting each controlling module with each controlled module; a register associated with each controlling module into which connection command signals therefrom are entered; comparing means associated with said registers for comparing a newly entered connection command signals in any register with signals stored in all other registers; means for generating an acceptance signal and closing the normally open information channel interconnecting the commanding controlling module and the controlled module identifiable with the newly entered connection command signal when the newly entered connection signal is not identical with a signal stored in any other register; and means for generating a rejection signal and replacing said newly entered connection command signal with said disconnect command signal when the newly entered signal is identical with a signal stored in any other register.

6. In a data processing system including a plurality of controlled modules and a plurality of stored program controlling modules wherein each controlling module is capable of providing a plurality of different connection command signals each of which is identifiable with one of said controlled modules and a disconnect command signal which is identifiable with no controlled module; interconnecting means for establishing communication paths between any controlling module and any controlled module in response to said connection command signals comprising: a plurality of normally open information channels interconnecting each controlling module with each controlled module; a register associated with each controlling module into which connection command signals therefrom are entered; comparing means associated with said registers for comparing a newly entered connection command signals in any register with signals stored in all other registers; means for generating an acceptance signal and closing the normally open information channel interconnecting the commanding controlling module and the controlled module identifiable with the newly entered connection command signal when the newly entered connection signal is not identical with a signal stored in any other register; and means for generating a rejection signal and replacing said newly entered connection command signal with said disconnect command signal when the newly entered signal is identical with a signal stored in any other register; and means for accepting only a predetermined one of a plurality of identical signals entered into said registers simultaneously and rejecting all others.

7. A modular data processing system comprising an exchange including a first group of sets of conductors and a second group of sets of conductors, normally open means interconnecting each conductor from each set of said first group with a conductor from each set of said second group, sense means connected to said conductor sets of said first group and responsive to signals thereon for closing said interconnecting means between selected sets of conductors of each of said groups; controlled modules; stored program controlling modules, each of said controlled modules connected to said sets of conductors of said second group, each of said controlling modules connected to said sets of conductors of said first group and at least one of said controlling modules connected to sets of conductors of both said first and second groups, each of said controlling modules capable of providing a plurality of said signals each of which is identifiable with one of said controlled modules; means for selectively generating a rejection criteria signal; and means coupling said rejection criteria signal to said sense means for preventing the closing of said interconnecting means.

8. In a data processing system including a plurality of controlled modules and a plurality of controlling modules wherein each controlling module is capable of providing a plurality of different connection commands each of which includes an address portion uniquely addressing one of said controlled modules; interconnecting means for establishing communication paths between any controlling module and any controlled module in response to said connection commands comprising: a plurality of normally open information channels interconnecting each controlling module with each controlled module; a register associated with each controlling module and capable of storing the address portion of said connection commands; comparing means associated with said registers for comparing a newly entered address in any register with addresses stored in all other registers and for generating a first signal if the newly entered address is identical to an address stored in any other register and for generating a second signal if the newly entered address is not identical to an address stored in any other register; means responsive to the generation of a connection command signal for temporarily storing the address portion thereof in the register associated with the controlling module generating said signal and for initiating operation of said comparison means; and means responsive to said first signal generated by said comparison means for holding said temporarily stored address portion in said register and for closing the normally open information channel interconnecting the commanding controlling module and the controlled module addressed by said generated connection command.

9. In a data processing system including a plurality of controlled modules and a plurality of stored program controlling modules wherein each controlling module is capable of providing a plurality of different connection command signals each including an address portion which is identifiable with one of said controlled modules and a disconnect command signal including an address portion which is identifiable with no controlled module; interconnecting means for establishing communication paths between any controlling module and any controlled module in response to said connection command signals comprising: a plurality of normally open information channels interconnecting each controlling module with each controlled module; a register associated with each controlling module and capable of storing the address portion of said connection commands; comparing means associated with said registers for comparing a newly entered address in any register with addresses stored in all other registers and for generating a first signal if the newly entered address is identical to an address stored in any other register and for generating a second signal if the newly entered address is not identical to an address stored in any other register; means responsive to the generation of a connection command signal for temporarily storing the address portion thereof in the register associated with the controlling module generating said signal and for initiating operation of said comparison means; means responsive to said first signal generated by said comparison means for holding said temporarily stored address portion in said register and for closing the normally open information channel interconnecting the commanding controlling module and the controlled module addressed by said generated connection command; and means responsive to a second signal generated by said comparison means for replacing said newly entered connection command address portion with the address portion of said disconnect command signal.

References Cited by the Examiner
UNITED STATES PATENTS

| 2,813,929 | 11/1957 | Oberman | 179—18 |
| 2,951,234 | 8/1960 | Speilberg | 340—172.5 |

ROBERT C. BAILEY, *Primary Examiner.*

MALCOLM A. MORRISON, *Examiner.*